United States Patent
Sim et al.

(10) Patent No.: US 8,154,580 B2
(45) Date of Patent: Apr. 10, 2012

(54) SYSTEM AND METHOD FOR FACILITATING USER COMMUNICATION FROM A LOCATION

(75) Inventors: Wong Hoo Sim, Singapore (SG); Kah Kheong Steven Loh, Singapore (SG)

(73) Assignee: Creative Technology Ltd, Singapore (SG)

( * ) Notice: Subject to any disclaimer, the term of this patent is extended or adjusted under 35 U.S.C. 154(b) by 810 days.

(21) Appl. No.: 12/276,209

(22) Filed: Nov. 21, 2008

(65) Prior Publication Data
US 2010/0128103 A1 May 27, 2010

(51) Int. Cl.
*H04N 7/14* (2006.01)
(52) U.S. Cl. ............... 348/14.02; 348/14.01; 348/14.12; 348/14.08; 725/92
(58) Field of Classification Search .... 348/14.01–14.16; 725/92, 115, 142, 37; 370/278, 312; 709/203–204
See application file for complete search history.

(56) References Cited

U.S. PATENT DOCUMENTS 7,215,648 B2 * 5/2007 Sullivan .................. 370/278
7,340,765 B2 * 3/2008 Feldmeier ................. 725/92

* cited by examiner

Primary Examiner — Melur Ramakrishnaiah
(74) Attorney, Agent, or Firm — Creative Technology Ltd

(57) ABSTRACT

A system and method for facilitating user communication from a location. The system comprises two or more cameras for capturing two or more videos at a first location, a control unit for streaming one or more of the videos captured to a first communication unit at the first location through a first network, and streaming one or more of the videos captured to a second communication unit located at a second location through a second network, a server for identifying a location data of the first location based on an identifier of the control unit, and a communication platform associated with the first location. The communication platform is accessible by the first and second communication units through the first and second networks respectively. The communication platform comprises a first display for displaying one or more of the videos captured, a second display for displaying the location data of the first location identified by the server, and one or more control interfaces for controlling the camera view of the one or more videos displayed in the first display, wherein controlling the camera view comprises switching the one or more videos displayed in the first display between videos captured by the two or more cameras.

30 Claims, 5 Drawing Sheets

SYSTEM AND METHOD FOR FACILITATING USER COMMUNICATION FROM A LOCATION

FIELD OF INVENTION

The present invention relates to a system and method for facilitating user communication from a location.

BACKGROUND

With the proliferation of webcams, digital video cameras, and the like, video conferencing services provided over the Internet are increasing. Typically, such services are found in social networking websites or instant messaging applications.

In some social networking websites or instant messaging applications, users are provided with a virtual video conference interface for real-time communication with other users who are online. To allow users to view each other on the website at their respective locations, they need to have webcams integrated with or connected to their communication units. Examples of such communication units are network enabled desktop computers, laptop computers, mobile phones, personal digital assistants, media players, entertainment devices, and the like. The interface may be in the form of a virtual chat room that requires users to login to engage in video-conferencing with other users.

In the entire video conference experience, the webcams of the users only serve the purpose of capturing the users' presence in the video conference so as to simulate a face to face meeting. The video conference interface usually only provides a display of the webcam view of the user who has been selected to engage in video conferencing. Nothing further is provided by the webcams or the video conference interface to enhance the video conference experience.

A need therefore exists to provide a system and method facilitating user communication from a location that addresses at least one of the above-mentioned problems.

SUMMARY

In accordance with an aspect of the present invention, there is provided a system for facilitating user communication from a location, the system comprising: two or more cameras for capturing two or more videos at a first location; a control unit for streaming one or more of the videos captured to a first communication unit at the first location through a first network, and streaming one or more of the videos captured to a second communication unit located at a second location through a second network; a server for identifying a location data of the first location based on an identifier of the control unit and a communication platform associated with the first location, the communication platform being accessible by the first and second communication units through the first and second networks respectively, the communication platform comprising: a first display for displaying one or more of the videos captured; a second display for displaying the location data of the first location identified by the server to associate the communication platform with the location data of the first location; and one or more control interfaces for controlling the camera view of the one or more videos displayed in the first display, wherein controlling the camera view comprises switching the one or more videos displayed in the first display between videos captured by the two or more cameras.

The first network may be a Wireless Local Area Network and the second network may be the Internet.

The communication platform may comprise one or more control interfaces for adding subtitles to the video displayed in the first display.

The communication platform may comprise one or more timing mechanisms for delaying the streaming of the video displayed in the first display to compensate for delays due to entering of subtitles.

The subtitles may be added using a speech-to-text based application.

The first communication unit, the control unit and one of the cameras may be components of a single device.

The control unit and one of the cameras may be components of a single device.

The control unit may be a component of the server.

The communication platform may comprise one or more avatars for identifying the first or second communication unit accessing the communication platform.

The communication platform may comprise one or more control interfaces only accessible to the first communication unit for disconnecting the second communication unit when the second communication unit is used to access the communication platform for viewing of the first display.

User interaction with the one or more communication interfaces and changes to the camera view in the first display may be captured and stored as a video file in a database.

The identifier may be an Internet Protocol Address of the control unit.

A separate sound source may be provided over ambient sound captured in one of the videos at the first location.

The one or more videos captured may be recorded and stored as a video file in a database.

Controlling the camera view may further comprise zooming in or out, or panning the camera view.

The communication platform may further comprise one or more communication interfaces for enabling users of the first or second communication unit to initiate communication with one another or with users of other communication units accessing the communication platform.

The one or more communication interfaces may enable user communication via instant messaging, telephone conferencing or video conferencing.

In accordance with another aspect of the present invention, there is provided a method for facilitating user communication from a location, the method comprising: capturing two or more videos at a first location using two or more cameras; streaming one or more of the videos captured to a first communication unit at the first location through a first network; streaming one or more of the videos captured to a second communication unit located at a second location through a second network; identifying a location data of the first location based on an identifier of a control unit capable of streaming the one or more videos captured to the first and second communication units; displaying one or more of the videos captured in a first display of a communication platform associated with the first location, the communication platform being accessible by the first and second communication units through the first and second networks respectively; displaying the location data of the first location in a second display of the communication platform to associate the communication platform with the location data of the first location; and controlling the camera view of the one or more videos displayed in the communication platform, the step of controlling comprising: switching the one or more videos displayed between videos captured by the two or more cameras.

The method may further comprise adding subtitles to the first display using one or more control interfaces in the communication platform.

The method may further comprise delaying the streaming of the video displayed in the first display to compensate for delays due to entering of subtitles using one or more timing mechanisms.

The method may further comprise adding the subtitles using a speech-to-text based application.

The method may further comprise identifying a user accessing the communication platform via the first or second communication unit using one or more avatars.

The method may further comprise capturing and storing user interaction with the one or more communication interfaces and changes to the camera view of the one or more videos displayed in the communication platform as a video file in a database.

The method may further comprise providing a separate sound source over ambient sound in one of the videos at the first location.

The method may further comprise recording one of the videos captured and storing the recorded video as a video file in a database.

The method may further comprise re-recording the recorded video so as to incorporate or change subtitles, sound effects, sound or music already incorporated in the recorded video using one or more control interfaces in the communication platform.

Controlling the camera view may further comprise zooming in or out, or panning the camera view.

The method may further comprise enabling users of the first or second communication unit to initiate communication with one another or with users of other communication units accessing the communication platform using one or more communication interfaces.

The method may further comprise enabling the user communication via instant messaging, telephone conferencing or video conferencing.

The method may further comprise disconnecting a communication unit accessing the communication platform using one or more control interfaces in the communication platform.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1:
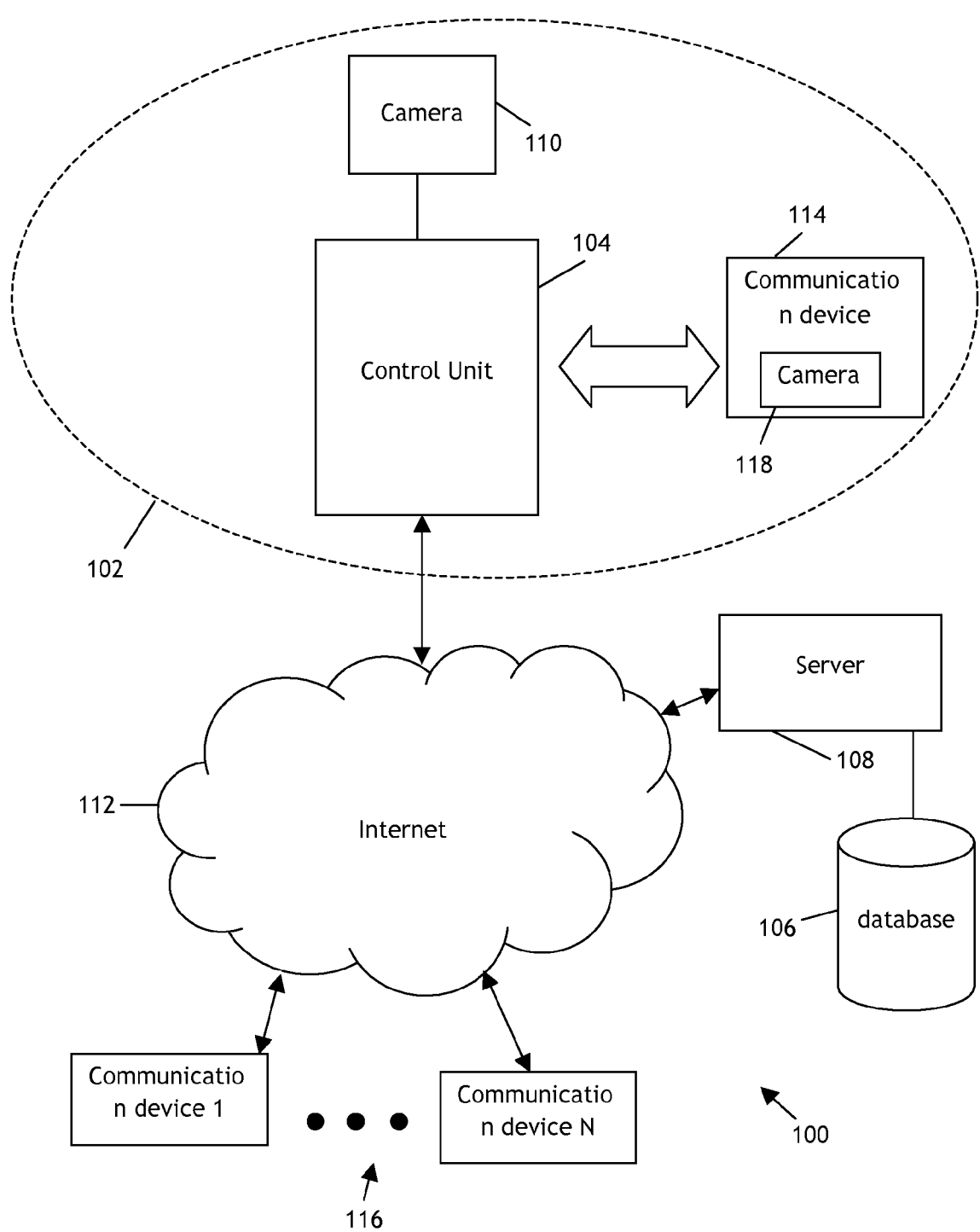
FIG. 1 is a schematic drawing of an example embodiment of the present invention.

In an example embodiment herein described, generally, there is provided a communication system including a communication platform, in the form of a web portal, to stream live webcasts of captured video from one or more locations, i.e. fixed public WiFi hotspots, for viewing by public users in the Internet.

Advantageously, users can access the web portal to view a live webcast at a public WiFi hotspot of their choice and on a camera view of their preference. The web portal includes one or more control interfaces that allow users to switch camera views displayed in the webcast between views provided by two or more cameras located at the location of the webcast. Additionally, the webcasts can be recorded for future viewing.

The web portal further includes communication interfaces for enabling communication between a first user at a first location and one or more users accessing the web portal to view the webcast of the first location on the Internet. The communication interfaces enable multimedia communication between the users by providing, for instance, a text messaging application, an audio transmission application for teleconferencing, a video conferencing application.

Advantageously, one or more control interfaces for adding subtitles in a live or recorded webcast are provided. This allows for translation of a spoken language in the webcast to a language understood by a targeted web audience or a deaf audience. It also allows addition of commentaries as subtitles in the live or recorded webcast.

In the example embodiment, more than one camera is included in the system for capturing the first location on video for the webcast. Additionally, the camera view of the camera capturing the live images and sound of the video at the webcast location is alterable by the first user using one or more control interfaces at the web portal. Advantageously, the first user can zoom and pan the camera views while communicating with one or more users accessing the web portal on the Internet via the communication interfaces.

The web portal enables users accessing the web portal on the Internet to select the live or recorded webcast they are interested to view. The web portal further includes control interfaces that enable the first user to comment and control the images shown in the webcast to, for instance, illustrate a particular aspect of the moving images captured at the first webcasted location. Advantageously, the web portal also enables users to engage in text messaging, teleconferencing and video conferencing with webcasters located at a public WiFi hotspot that is the subject of a live webcast.

Furthermore, webcast viewers can find out the physical location of the webcast and the webcaster, as this data is displayed on the web portal. One can also locate the webcaster by controlling the camera views using the relevant control interfaces and communicate with the webcaster using the communication interfaces available at the web portal.

More details of the example embodiment would be described as follow.

FIG. 1 illustrates a system 100 according to the example embodiment. There is provided a Wireless Local Area Network (WLAN) 102 i.e. a public WiFi hotspot located at a first location. The WLAN 102 includes a control unit 104, a first camera 110 connected to the control unit 104 for capturing a first camera view of the webcast at the first location. There is also provided a server 108 that is connected to a database 106 and located at a remote location. The first camera 110 is connected to an Input/Output (I/O) interface (not shown in the Figures) of the control unit 104, for instance, via the Universal Serial Bus (USB), Firewire connection, Universal Asynchronous Receiver/Transmitter (UART), or the like. A first communication unit 114, which is a WiFi enabled device, is located at the first location, and is connected to the control unit 104 wirelessly via WiFi (Wireless Fidelity), which is based on IEEE 802.11 Wireless standards. The first communication unit 114 includes a second camera 118 that is capable of capturing a second camera view of the webcast at the first location. The control unit 104 further includes a WiFi interface card (not shown in the Figures) for WiFi connection with the first communication unit 114. There is further provided N number of other communication units 116 connected to the Internet, where N=1, 2, and so on.

It is appreciated that the communication units 114, 116 may be desktop computers, server computers, laptop computers, mobile phones, personal digital assistants, media players, entertainment devices, communication devices, and the like. Each of the N communication units 116 is located at a remote location, for instance, one of the N communication units may be a home desktop computer accessing the Internet 112, a portable WiFi enabled device located at another WLAN, or the like.

In the example embodiment, the control unit 104 and the server 108 each includes an integrated network controller (not shown in the Figures) i.e. a network interface card, which connects the control unit 104 and the server 108 to the Internet 112. The control unit 104 further includes the relevant hardware and software for controlling the first camera 110 and for WiFi connectivity. The server 108 further includes the relevant hardware and software for processing data to carry out the functions of a web server computer.

In the example embodiment, the control unit 104 is a WiFi access point of the WLAN 102 which allows WiFi-enabled devices in the vicinity of the WLAN 102 to gain access to the Internet. When a first user using a WiFi enabled device accesses the Internet through the control unit 104, his or her location can be indicated to a second user accessing the Internet remotely, i.e. from outside the WLAN 102, via for instance one of the N communication units 116. Advantageously, the second user can find out the location of the first user by accessing the web portal. The view of the exact location of the first user in the WLAN 102 can also be shown using the first camera 110 or the second camera 118.

The first and second cameras 110 and 118 respectively, may be digital cameras where each includes a microphone and adjustment means for panning and/or zooming in or out the captured view. If the camera supports optical panning and zooming, there would be provided one or more electric motor and mechanical parts to enable these features. The cameras 110 and 118 capture both moving images and sound produced at the first location. The camera view of the camera 110 can be panned and zoomed in or out, digitally or optically, based upon control signals received by the cameras 110 and 118 from the control unit 104 and the first communication unit 114 respectively. The control signals are generated from user inputs entered at the first communication unit 114 and directed from the server 108 to the control unit 104, which controls the first camera 110, and/or to the first communication unit 114, which controls the second camera 118. It is appreciated that the circuitries and electronic components of the cameras 110 and 118 would be known to a person skilled in the relevant art.

During operation, the control unit 104 streams the captured video in the camera views of the first and second cameras 110 and 118 respectively to the server 108. The server 108 in turn streams the captured sound and moving images to the first communication unit 114 and the N communication units 116 via the Internet 112. Depending on user request, the control unit 104 may stream only one video captured by one of the first and second cameras 110 and 118, or stream both videos captured by both cameras 110 and 118. The streaming can be done in real time or with a slight delay due to, for instance, problems such as poor net connection, bandwidth restrictions, and the like.

The database 106 is a memory device connected to the server 108, for instance, a Hard Disk Drive in the example embodiment. The database 106 contains data of, for instance, user information, uploaded multimedia files (e.g. textual, audio, picture or video) including recorded webcasts, history of user text entries, codes of web, WLAN and device driver applications that enable the server 108 to host a web portal and communicate/interact with the control unit 104, the first communication unit 114 and the N communication units 116 via the Internet 112. The server 108 hosting the web portal may be operated by a communication service provider.

In the example embodiment, the web portal hosted by the server 108 functions as a remote controller for the user of the first communication unit 114 to control the first and second cameras 110 and 118 respectively, and as a communication platform for facilitating communication over the Internet 112 between two or more users. The web portal includes a display (304 in FIG. 3) for displaying the video streamed by the control unit 108 on a webcasting webpage (300 in FIG. 3 and 400 in FIG. 4) dedicated for a specific webcast. The user of the first communication unit 114 accesses the web portal through a web browser application on the first communication unit 114.

In the example embodiment, the control unit 104 is provided with a fixed Internet Protocol (IP) address. The database 106 is pre-stored with the IP address and the physical location data, i.e. the venue's address and geographical location, of the control unit 104, which is associated with the IP Address. The server 108 can retrieve data on the physical location of the control unit 104 from the IP address. Alternatively, the server 108 may be installed with the appropriate web tools to automatically detect the physical location of the control unit 104 using the IP Address of the control unit 104 without having to rely on pre-stored data in the database. In yet another alternative, the physical location data may be entered in a webcast creation web page of the web portal (e.g. user webpage 300 in FIG. 3) by a user on the first communication device 114 and sent from the first communication device 114 to the server 108.

During operation, when a WiFi enabled device, e.g. the first communication unit 114, connects to the control unit 104 via WiFi and accesses the web portal, the server 108 detects the IP Address of the control unit 104 and retrieves the corresponding location data of the control unit 104 from the database 106. If a webcast is created using the WiFi enabled device within the vicinity of the WLAN 102, which is provided with WiFi support by the control unit 104, the location data of the webcast and the control unit 104 would be displayed in the web portal and the whereabouts of the webcaster would be made known to users viewing the webcast at the web portal. It is appreciated that other identifiers such as Media Access Control (MAC) Address, product serial number, encryption key, or the like, may be used instead of the IP address of the control unit 104.

Figure 2:
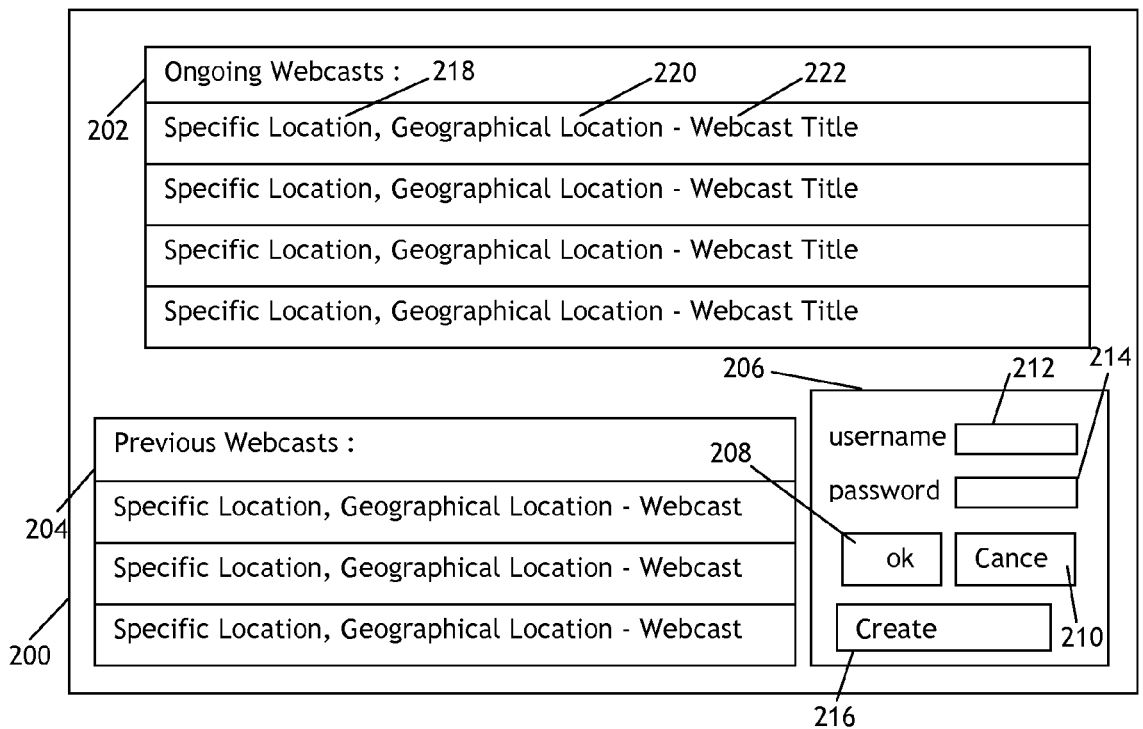
FIG. 2 shows a simplified view of a screen capture of a first web page according to an example embodiment of the present invention.

With reference to FIG. 2, the web portal has a main web page 200, which is viewable by users accessing the web portal in a first instance. The main web page 200 provides users with a list of existing or most recently created live webcasts in a first window 202 and a list of previous webcasts (recorded footages) in a second window 204. By selecting one of the webcasts in the lists 202, 204, users can call out a webcasting webpage (400 in FIG. 4) dedicated for the selected webcast.

Each webcast entry listed in the main web page 200 displays the title of the webcast in a webcast title field 222, a specific location field 218 and a geographical location field 220. The specific location field 218 and a geographical location field 220 specify where the webcaster and the control unit (104 in FIG. 1) are located. For instance, the specific location field 218 may be the exact venue and address of the webcast location, e.g. "ABC Building Auditorium, XYZ Street 7, Postal Code 123456", and the geographical location field 220 may be the city and the country, e.g. "New York City, United States Of America". The details of the specific location field 218 and geographical location field 220 are displayed after they are retrieved from the database 106 at the time when the webcaster logins to the user webpage (300 in FIG. 3) and the server 108 has detected the IP Address of the control unit 104. Advantageously, the user accessing the main web page 200 can choose to view a webcast broadcasted from a public WiFi Hotspot at a location of their choice and communicate with the webcaster or another user located at the public WiFi Hotspot.

The main web page 200 further includes a login interface 206 having a login confirmation button 208 and a login cancellation button 210. There is provided a username text box 212 for entering user name and a password text box 214 for entering password. Furthermore, there is provided a 'create account' button 216 for users to create a user account or register with the web portal. User information is acquired from users in a separate web page (not shown in the Figures), which appears after selecting the 'create account' button. User information includes personal and contact details, such as, name, alias, address, email address, date of birth, and interests/hobbies. It also includes user authentication details, i.e. username and password, for verifying registered users when they login to the web portal via the login interface 206.

When a user login to the web portal, the user name and password entered in the username text box 212 and the password text box 214 are verified at the server (108 in FIG. 1). The server (108 in FIG. 1) compares the entries with previously stored data during registration in the database (106 in FIG. 1). A user is allowed access to the web portal with his/her registered user identity only upon successful verification of the user authentication details by the server (108 in FIG. 1). It is appreciated that other Internet based authentication and security methods known to a person skilled in the relevant art may be implemented for user authentication.

In the example embodiment, the web portal supports various types of user access. Each type of user access has different access privileges to the web portal. Users select the type of user access they wish to subscribe to at the time of registration. Only access privileges from Levels 2 to 5 are available for users to subscribe. Level 1 is only available to system administrators. Only system administrators can issue Level 1 access privileges. Non-limiting examples of the access privileges available to users of the web portal are as follow.

Level 1 access privilege—This access privilege provides Level 1 users with system administration capabilities. A non-exhaustive list of services available to a Level 1 user is as follow:
    create a webcast,
    control the camera view of the camera (110 and/or 118 in FIG. 1) capturing the webcast created by all users,
    enable/block user access to webpage(s)/services of the web portal,
    initiate communication with other users,
    view/add/edit/delete all the contents in the web portal, which are created/uploaded by any user,
    filter content accessible by the five access privileges herein described,
    switch camera view to another view captured by another camera at the webcast location, and
    view/edit/delete all open and close group user webpage(s) (300 in FIG. 3) belonging to all users of the web portal.
Level 1 users must access the web portal with an identity created by the Level 1 user during registration before he/she gets to use the aforementioned services.

Level 2 access privilege—This access privilege provides Level 2 users with webcast creation capabilities. A non-exhaustive list of services available to a Level 2 user is as follow:
    create a webcast,
    control the camera view of the camera (110 and/or 118 in FIG. 1) capturing the webcast created by the Level 2 user,
    control camera (110 and/or 118 in FIG. 1) capturing a webcast created by another user only upon approval by the user,
    enable/block other user access to the user's webpage (300 in FIG. 3),
    initiate communication with other users accessing any one of the Level 2 user's webpage(s) (300 in FIG. 3),
    view/add/edit/delete all content created by the user,
    view/edit/delete all open and close group user webpage(s) (300 in FIG. 3) created by the Level 2 user,
    switch camera view to another view captured by another camera at the webcast location, and
    view only open group user webpage(s) (300 in FIG. 3) belonging to other users.
Level 2 users must access the web portal with an identity created by the Level 2 user during registration before he/she gets to use the aforementioned services.

Level 3 access privilege—This access privilege provides Level 3 users with communication capabilities. However, a Level 3 user cannot create a webcast. A non-exhaustive list of services available to a Level 3 user is as follow:
    view all open group user webpage(s) (300 in FIG. 3) belonging to other users,
    control the camera view of the camera (110 and/or 118 in FIG. 1) capturing a webcast created by another user only upon approval by the user,
    switch camera view to another view captured by another camera at the webcast location, and
    initiate communication with other users accessing an open group user webpage (300 in FIG. 3) via, for example, text messaging, audio transmission over the Internet or video conferencing.
Level 3 users must access the web portal with an identity created by the Level 3 user during registration before he/she gets to use the aforementioned services.

Level 4 access privilege—Level 4 users cannot initiate communication with other users. Level 4 users can communicate with a Level 1, 2 or 3 user only if the Level 1, 2 or 3 user initiates communication with the Level 4 user. A non-exhaustive list of services available to a Level 4 user is as follow:
    view all open group user webpage(s) (300 in FIG. 3) belonging to other users,
    switch camera view to another view captured by another camera at the webcast location, and
    control the camera view of the camera (110 and/or 118 in FIG. 1) capturing a webcast created by another user only upon approval by the user.
Level 4 users must access the web portal with an identity created by the Level 4 user during registration before he/she gets to view a selected open group user webpage.

Level 5 access privilege—This access privilege is given to users who have not login to the web portal via the login interface 206. A Level 5 user has access to some but not all open group user webpage(s). Notably, Level 5 users may not initiate communication with other users. Level 5 users can communicate with a Level 1, 2 or 3 user only if the Level 1, 2 or 3 user initiates communication with the Level 5 user.

Level 5 users are not registered with the web portal. Hence, Level 5 users access the web portal with an anonymous identity created before they get to view a selected open group user webpage. The system administrator selects what open group user webpage(s) can be viewed by the Level 5 users. Level 5 users cannot switch camera views.

In the example embodiment, the list of existing or most recently created live webcasts in the first window 202 and the list of previous webcasts (recorded footages) in the second window 204 of the main web page 200 comprise open group user webpage(s) viewable by Level 1 to 5 users.

Contents of the web portal include text, video (including live and previous webcasts) and audio data created/uploaded by a user or system administrator to the web portal. An open group user webpage is one in which the user who created the webpage has given access to view the webcast to Levels 1 to 5 users. A close group user webpage is one in which the user who created the webpage has given access to view the webcast only to other users invited by him/her.

It is appreciated that in other example embodiments, there may be either more or less than five levels of user privileges. As such, the services available for each level may either vary in accordance with the number of levels or in accordance with administrator settings.

In the example embodiment, there is provided one or more avatars (e.g. 412 in FIG. 4) selectable for use to identify each user accessing the web portal via any one of the first communication unit (114 in FIG. 1) or N other communication units (116 in FIG. 1) upon user access at the web portal. For registered users (Level 1 to 4 users), they are either required to select an avatar or are assigned an avatar to represent their virtual presence. During registration, they may be prompted by the system through message boxes (not shown in the Figures) to select one of the pre-stored avatars on the web portal to represent his or her presence in the web portal. The assigned avatar may be one of the pre-stored avatars. Unregistered users (Level 5 users) can also access the web portal with a temporary avatar, which exists only during the period the user remains connected to the web portal. If a Level 5 user who has not login to the web portal via the login interface (206 in FIG. 2) selects one of the existing webcast entries on the main web page (200 in FIG. 2), a message box would appear to request the user to select an online avatar and to give a name for it. In the example embodiment, all users have the option to name and rename the avatars. Data relating to the pre-stored avatar are stored in the database (106 in FIG. 1) and processed by the server (108 in FIG. 1) for displaying on the web pages of the web portal. The avatar may be an animation (e.g. in .gif file format) or static picture (e.g. in .gif, .jpg, .tiff, .png or .bmp formats) that is represented in two or three dimensions. Users may have the option to change the avatar and upload their own picture or avatar if they decide not to use one of the pre-stored avatars.

Figure 3:
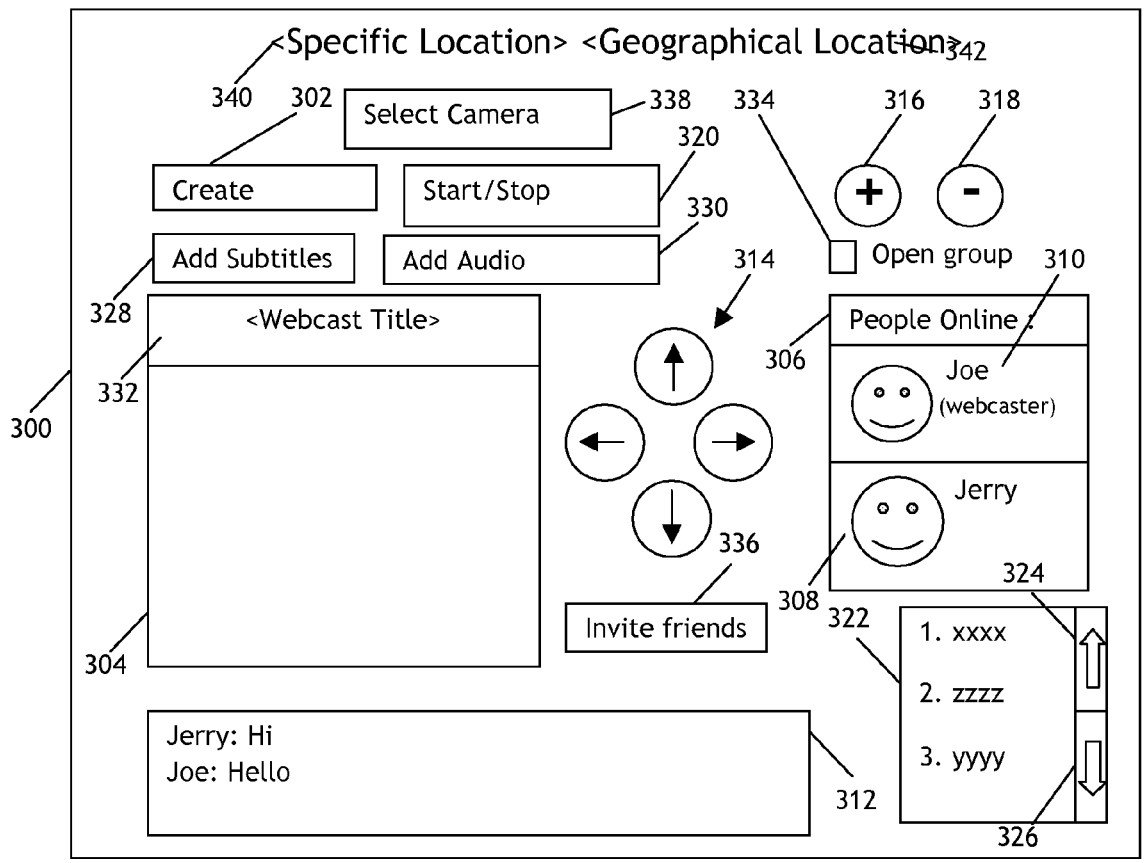
FIG. 3 shows a simplified view of a screen capture of a second web page according to an example embodiment of the present invention.

FIG. 3 shows a user webpage 300 after a registered Level 1 or 2 user has login to the web portal via the main web page 200 using the first communication unit (114 in FIG. 1).

The user webpage 300 displays the location data of the webcast in a specific location field 340 and a geographical location field 342. Similar to the specific location field (218 in FIG. 2) and the geographical location field (220 in FIG. 2), the specific location field 340 and the geographical location field 342 indicate the exact venue and address of the webcast location, and indicate the city and the country of the webcast location, respectively. The details of the specific location field 340 and a geographical location field 342 are displayed after they are retrieved from the database (106 in FIG. 1) at the time when the user logins to the web portal and the server (108 in FIG. 1) has detected the IP Address of the control unit (104 in FIG. 1).

The user webpage 300 includes a 'create webcast' button 302 for the registered user to create a webcast. If the registered user or also herein known as the webcaster selects the 'create webcast' button 302, the relevant software drivers would run in the background on the control unit (104 in FIG. 1) to search for the presence of cameras connected to it. In the example embodiment, the first and second cameras (110 and 118 in FIG. 1) are directly connected to the control unit (104 in FIG. 1). When these camera connections are detected, a dialogue box (not shown in the figures) will be displayed to prompt the webcaster to select one of the camera connections. After selecting the camera connection, the video captured by the selected camera connection will be displayed in a webcast display window 304. If only one camera connection is detected, the camera view displayed in the display window 304 would show the view captured by the single camera on selecting the 'create webcast' button 302. No dialogue box would be displayed in this instance.

In addition to selection of the camera connection, in the example embodiment, the dialogue box also prompts the webcaster to select between streaming the video captured from the first camera (110 in FIG. 1), the second camera (118 in FIG. 1), or from both cameras (110 and 118 in FIG. 1).

If the webcaster chose to stream the video captured from the first camera (110 in FIG. 1), webcast viewers watching the webcast from the webcasting webpage (400 in FIG. 4) would not be able to switch to the camera view of the second camera (118 in FIG. 1) in the webcast display window (404 in FIG. 4) and vice versa, as the video captured by the second camera is not streamed to them. In this case, the Switch Camera View button (418 in FIG. 4) accessible by webcast viewers for switching camera views would be disabled.

Only the webcaster can change the webcast streaming settings. Also, the webcast, which webcast viewers can see in the webcast display window (404 in FIG. 4), would be the video captured on the camera that is selected by the webcaster.

If the webcaster chose to stream both videos captured by the first and second cameras (110 and 118 in FIG. 1), webcast viewers would be allowed to switch between camera views captured by the two cameras (110 and 118 in FIG. 1). In this case, the Switch Camera View button (418 in FIG. 4) would be enabled. Also, the camera view seen on the display window 304 or the webcast display window (404 in FIG. 4) by the webcaster and each individual webcast viewer would be based on their selection.

After selecting the camera view to be displayed in the display window 304 and deciding whether to stream one or both videos captured by the first and second cameras (110 and 118 in FIG. 1), the selected videos would be streamed from the control unit (104 in FIG. 1) to the server (108 in FIG. 1). At this juncture, the server (108 in FIG. 1) only streams the selected camera view to the first communication unit (114 in FIG. 1). The webcaster can see the selected camera view in the display window 304. The webcast is not streamed for viewing on any external devices, such as the N communication units (116 in FIG. 1) yet so as to allow the webcaster to adjust or change the camera view before activating the streaming of the webcast to webcast viewers by selecting a webcast control button 320.

The webcast control button 320 starts and stops the streaming of the webcast from the server (108 in FIG. 1) to the N communication units (116 in FIG. 1). In the example embodiment, when the webcast control button 320 is selected in a first instance, i.e. signifying 'start', the streaming of the webcast would commence, and the server (108 in FIG. 1) would start to record the webcast. The recording is stored in the database (106 in FIG. 1). At the same time, the webcast would also be made available in the first window (202 in FIG. 2) for public viewing. Alternatively, it is appreciated that the webcast may be recorded on the first communication unit (114 in FIG. 1) or on both the first communication unit (114 in FIG. 1) and the server (108 in FIG. 1). When the webcast control button 320 is selected in a second instance, i.e. signifying 'stop', the streaming of the webcast would end, and a dialogue box (not shown in the Figures) would appear to prompt the webcaster whether to delete the recording made so far or to keep the recording and make it available for future viewing.

A Select Camera View button 338 is provided for the webcaster to switch between camera views captured by different cameras. In the example embodiment, there are two camera views captured by the first and second cameras, i.e. 110 and 118 in FIG. 1. Selecting the Select Camera View button 338 would call out the dialogue box similar to the one called up when more than one camera connections are detected after the selection of the 'create webcast' button 302. The camera with the preferred camera view can be selected by the webcaster in the same fashion.

There is further provided a Webcast Title Entry text box 332 for the webcaster to enter the title of the webcast. Selecting the text box 332 once using, for instance, a mouse cursor or finger (for touch screens), would allow the user to edit the text in the text box 332. Selecting an 'enter' key (e.g. the 'enter' key on a computer keyboard) on the first communication unit (114 in FIG. 1), or selecting on other areas or items on the user web page would call out a webcast title confirmation dialogue box consisting of a message "Confirm Webcast Title entry?", an 'OK' button for confirming the entered/edited webcast title and a 'Cancel' button for cancelling webcast title confirmation. Upon confirmation by selecting the 'OK' button, the title entered would be displayed at the text box 332 located above the webcast display window 304 in the user webpage 300, in the first window 202 in FIG. 2 of the main web page 200 in FIG. 2, and at the location 422 for displaying the webcast title on the webcasting webpage 400, which is described with reference to FIG. 4.

In the example embodiment, subtitles can be added to the webcast. The subtitles entered are located at a lower portion 338 of the webcast display 304. Similarly, subtitles could appear at the same location in the webcast display 404, which is described with reference to FIG. 4. It is appreciated that there could be control interfaces available to relocate the subtitles to other locations on the display 304 (and 404 in FIG. 4) or to other locations on the web pages 300 or 400. The words and/or characters appearing in the webcast may be overlaid on the display 304 (and 404 in FIG. 4) of the webcast or be embedded with the video stream of the webcast.

The control interfaces for adding subtitles in the example embodiment are as follow.

An activator, i.e. an Add Subtitle control button 328, is provided on the user webpage 300 for starting subtitle entering applications, which may be manual text entry based and/or speech-to-text based.

If a manual text entry based application is implemented, selecting the Add Subtitle control button 328 would call out an Add Subtitle dialogue box (not shown in the Figures). The Add Subtitle dialogue box includes a text box for the user to enter subtitles to the webcast and a 'Submit' button for posting the entered subtitles for displaying at a lower part of the display window 304. As speed is important for displaying subtitles, the subtitles may also be submitted for displaying in the webcast by simply pressing an 'enter' key (e.g. the 'enter' key on a computer keyboard) on the first communication unit (114 in FIG. 1) after text has been entered into the text box. The displayed subtitles may automatically disappear from the webcast in a pre-determined time if there are no new subtitles submitted.

A speech-to-text based application may be additionally or solely provided for the generation of subtitles. If it is additionally provided on top of a manual text entry based application, the Add Subtitle dialogue box that appears after selecting the Add Subtitle control button 328 would further include a selectable option, e.g. a button, to run the speech-to-text based application. If it is solely provided, the speech-to-text based application would run immediately on selection of the Add Subtitle control button 328. After the speech-to-text based application is run, the speech-to-text based application automatically searches for a sound input device, such as a microphone, that is built-in with or connected to the communication unit, which the user is using to access the user webpage 300. If there is more than one sound input device, a dialogue box would appear to prompt the user to select one of the sound input devices. After a sound input device is selected, the speech-to-text based application would start to obtain sound inputs from the device. If the sound input is not already digitised, it would be converted to a digital format that is suitable for applying a speech-to-text algorithm to determine and generate the words and/or characters in the sound input for displaying in the display 304 (and 404 in FIG. 4) of the webcast.

Advantageously, users accessing the webcasting webpage 400, described with reference to FIG. 4, via their communication units, can view the subtitles entered by the webcaster at the user webpage 300 in real time. In the example embodiment, to prevent the subtitles from appearing too soon or too late at the display (404 in FIG. 4) in the webcasting webpage (400 in FIG. 4), which is viewed across the Internet, timing mechanisms may be implemented to ensure that the video displayed at the webcasting webpage (400 in FIG. 4) is displayed in synchronization with the rate at which the subtitles are appearing in the video displayed at the user webpage 300. To compensate for user delays in generating subtitles, especially in the case where a manual text entry based application is used, the timing mechanisms may include tuning interfaces to allow a webcaster to deliberately delay the transmission of the webcast so that user delays due to the entering of subtitles could be eliminated.

Furthermore, there is provided in the user webpage 300 an Add Audio Source control button 330 for the user to provide an alternative source of audio input in addition to the sound captured by the camera microphone of the camera (110 in FIG. 1). The alternative audio source may complement the camera microphone of the camera (110 in FIG. 1) if the camera microphone is activated, or it may serve as the only source of sound for the webcast. Advantageously, the user can provide voice narration for the webcast through the alternative audio source. By selecting the Add Audio Source control button 330, an Add Audio Source dialogue box (not shown in the Figures) would be called out. The Add Audio Source dialogue box consists of a message prompting the user to select a sound input device as audio source, a selection menu for selecting the sound input device from a list of detected sound input devices available on the first communication unit 114, and an 'OK' button for confirming the selected sound input device. As the Add Audio Source dialogue box is being displayed, the server (108 in FIG. 1) also runs relevant software to detect all the sound input devices connected and available on the first communication unit 114 to include them in the list of detected sound input devices for user selection. Upon making the sound input device selection and selecting the 'OK' button, the first communication unit 114 and the server (108 in FIG. 1) would run relevant software to enable the streaming of the audio input from the selected sound input device. A sound input device may, for instance, be a built-in microphone on the first communication unit 114, a plug-in computer audio card, or a built-in computer main board audio interface with a connected microphone.

There is provided a contact list 306 containing, in this case, a first contact field 310 (user webpage) displaying an avatar and the username of the webcaster and a second contact field 308 (user webpage) displaying an avatar and the username of a user who has selected to view the webcast from the main web page (200 in FIG. 1). Each of these contact fields are activators, which may be mouse action triggered or finger action triggered (in the case of touch screens), to enable the user of the user webpage 300 to engage in one-to-one user text messaging, speak to the user associated with the contact field selected via audio transmission over the Internet (i.e. teleconferencing), and engage the user associated with the contact field in video conferencing. For instance, these communication functions may be enabled from a pop-up menu (not shown in the Figures), which provides options for selecting these functions. The pop-up menu can be displayed by rolling a mouse cursor over a contact field followed by clicking a right mouse button or by selecting the contact field using a finger (in the case of touch screens). Some of the options in the pop-up menu may also include enabling the user associated with a contact field, who may be a Level 3 or 4 or 5 user, to communicate with one or more other users in the contact list 306 or to enable the Level 3, 4 or 5 user to control the camera.

The user webpage 300 includes a first control button 316 for controlling zooming in the camera view of the camera (110 in FIG. 1) and a second control button 318 for controlling zooming out the camera view. Panning control of the camera view is controlled by selecting four directional control buttons 314 in the desired manner. When one of the control buttons are selected, a control signal containing data required to instruct the first or second camera (110 or 118 in FIG. 1, respectively) for panning or zooming is generated and sent from the first communication unit (114 in FIG. 1) to the server (108 in FIG. 1). The server (108 in FIG. 1) in turn sends the control signal to the control unit (104 in FIG. 1). Finally, the control unit (104 in FIG. 1) sends the control signal to the first or second camera (110 or 118 in FIG. 1, respectively). It is noted that, in the example embodiment, a Level 3, 4 or 5 user can control the first or second camera (110 or 118 in FIG. 1, respectively) upon approval by a Level 1 or 2 user.

There is also provided a common chat window 312 for text messaging between all the users in the contact list 306. The chat window 312 is visible to all the webcaster and user(s) who access the user webpage 300.

There is further provided a webpage listing window 322, a page up button 324 and a page down button 326 for scrolling entries page by page in the webpage listing window 322. The webpage listing lists web pages of recorded webcast(s) and current live webcast(s). By selecting an entry, the user webpage 300 of the recorded webcast or the current live webcast would be called out in a separate Internet browser window or in a separate Internet browser tab.

Furthermore, there is provided a check box 334 for selecting whether the webcast created would be available as an open group user webpage, which is viewable by Levels 1 to 5 users (i.e. the public). By default, the webcast would be available as a closed group user webpage where the users viewing the webcast are specifically invited by the user.

There is also provided an 'invite friends' control button 336 for inviting users to view the webcast. A dialogue box (not shown in the Figures) would pop up after selecting the button 336. The dialogue box has options for the user to invite/alert friends to view the webcast via email, text messaging, short messaging service (SMS), or the like.

Figure 4:
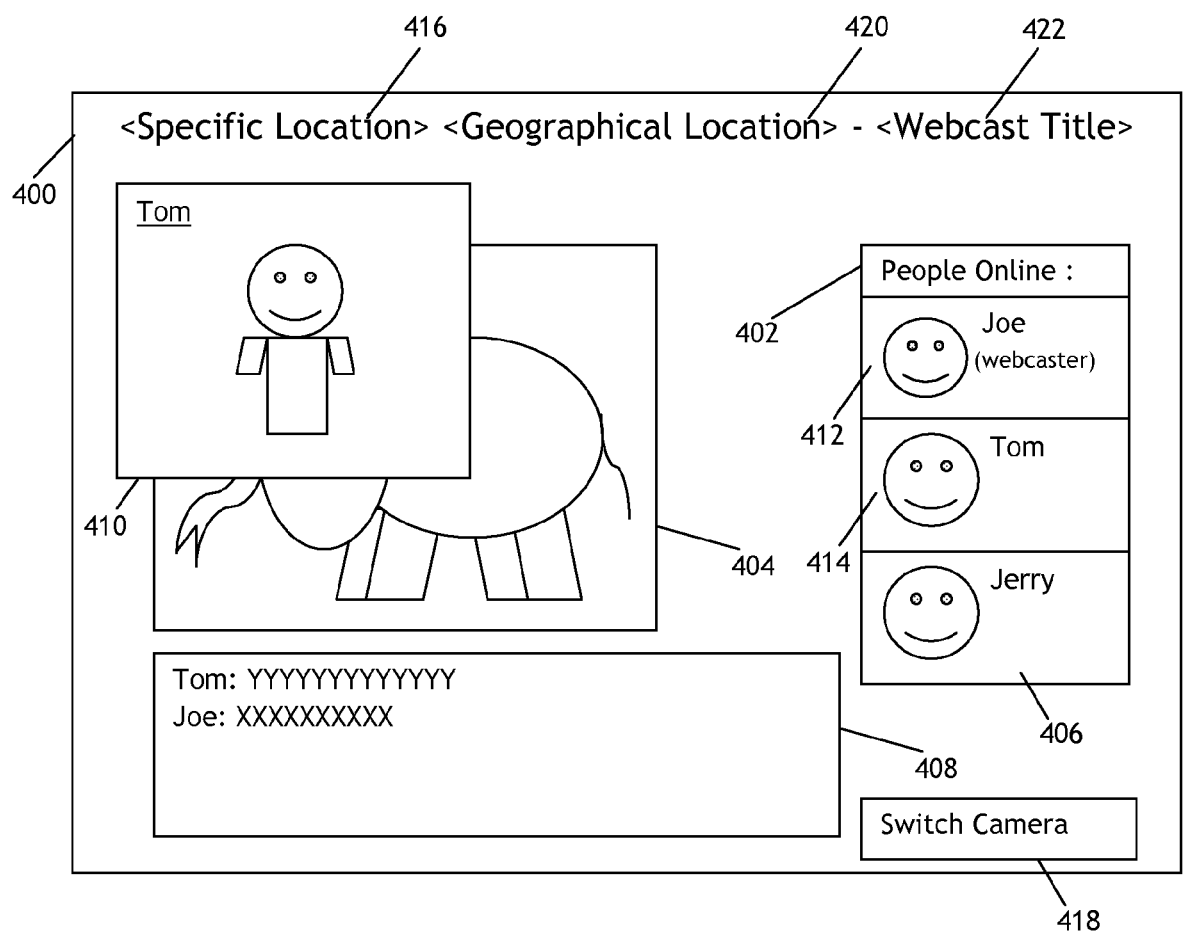
FIG. 4 shows a simplified view of a screen capture of a third web page according to an example embodiment of the present invention.

FIG. 4 shows an illustration of a webcasting webpage 400 of an existing webcast that is displayed after a webcast viewer, which is a Level 3 user in the example embodiment, login to the web portal and selected one of the webcast entries from the first window 202 on the main web page (200 in FIG. 2). The webcasting webpage 400 includes a specific location field 416 showing, for example, the venue and address of the webcast; a geographical location field 420 showing, for example, the city and country; a webcast title field 422 showing the webcast title; a display window 404 for displaying the webcast; and an online contact list 402 containing the avatars and username of all the users who have accessed the webcasting webpage 400. It is noted that in this example the webcasting webpage 400 does not have control interfaces to create a webcast like, for instance, the 'create webcast' button 302 in the user webpage (300 in FIG. 3).

There is provided a Switch Camera view button 418 in the webcasting webpage 400. This button is enabled only when the webcaster has selected the streaming of two or more videos captured on cameras at the webcast location at the time of the webcast creation. When the webcast viewer selects this button 418, control signals will be generated to run the relevant software drivers of the control unit (104 in FIG. 1) to search for the presence of cameras connected to it. In the example embodiment, the cameras connected to the control unit are the first and second cameras 110 and 118 in FIG. 1. When the camera connections are detected, a dialogue box (not shown in the figures) is displayed to prompt the webcast viewer to select the camera with the preferred camera view for displaying in the webcast display window 404. The dialogue box contains a list of all the camera connections that are found for user selection. If only one camera connection is detected, the camera view displayed in the display window 404 would be the view captured by the single camera. No dialogue box would be displayed in this instance. After selecting the preferred camera view, the selected camera view is streamed from the control unit (104 in FIG. 1) to the server (108 in FIG. 1) and is displayed in the display window 404 for viewing by the webcast viewer.

In the example embodiment, only Level 1 to 4 webcast viewers viewing the webcast can switch camera views displayed in the webcast display window 404. It is appreciated that, in another embodiment, the web portal may be configured such that all the webcast viewers can only see the same view and any changes to the camera view by one webcast viewer or the webcaster would also change the camera view displayed to all the webcast viewers.

The online contact list 402 is visible to all the users (Levels 1 to 4 only) in the contact list 402. In this case, there is provided in the contact list 402, a first contact field 412 (webcasting webpage) belonging to the webcaster, a second contact field 414 (webcasting webpage) of another user who has previously accessed the webcasting webpage 400 and a third contact field 406 (webcasting webpage) belonging to the new user who has just accessed the webcasting webpage 400. After the new user gains access to the webcasting webpage 400, the contact list 402 is refreshed on all the other users' communication unit displays to show the addition of the third contact field 406 (webcasting webpage) in the contact list 402. The appearance of the third contact field 406 (webcasting webpage) displaying the avatar and the username of the new user in the contact list 402 is an indication of the status of availability for communication to all the other users in the contact list. It is appreciated that other indicators can be included, such as the appearance of text description adjacent the username to indicate 'available' or 'not available' status. It is noted that if a Level 4 or 5 user accesses the webcasting webpage 400, all the communication interfaces would be disabled for the Level 4 or 5 user unless the webcaster enables the Level 4 or 5 user to communicate.

If the webcaster, who is a Level 1 or 2 user, enables all Level 3, 4 or 5 users in the contact list (e.g. 306 in FIG. 3) to communicate with one another from the user webpage (e.g. 300 in FIG. 3), then these users accessing the corresponding webcasting webpage 400 of the user webpage (e.g. 300 in FIG. 3) would be able to initiate communication with one another. For instance, if communication is enabled for all users in the contact list 402, one of the other two users in the contact list 402 can communicate with the user associated with the third contact field 406 by selecting the third contact field 406 in the contact list 402 and selecting the means of communication. The users can communicate with each other by, for instance, text messaging all the users in a common chat window 408 viewable by all the users, one to one text messaging, hold a teleconference (audio transmission only) and/or engage in video conference (video and audio transmission) with selected users in the contact list 402. Users who have any networked image capture apparatus or a video conferencing apparatus at their respective locations can carry out video conferencing with other users who have accessed the webcasting webpage 400. Users who do not have any networked image capture apparatus or a video conferencing apparatus with them can communicate with users who have accessed the webcasting webpage 400 through audio transmission over the Internet (112 in FIG. 1), if a microphone and a speaker are available, or through instant text messaging.

For illustration purposes, FIG. 4 shows that the first user (webcaster) has selected an option to communicate with the second user in a video conference and the second user has approved it. After the option is selected, a second display window 410 displaying the webcam view of the second user appears. The second display window 410 can be resized and dragged around the screen display of the webcasting webpage 400 by a mouse cursor or finger contact (if touch screen is being used). In the example embodiment, only the user who has selected to hold a video conference with the second user can see the second display window 410. However, it is appreciated that in other example embodiments, the second display window 410 may be visible to more users when other users in the contact list 406 selects to engage the second user in a video conference and the second user approves it. Selecting the option to engage in video conference may be done by, for instance, selecting a video conference option in a pop-up menu, which appears automatically upon placing the mouse cursor over the user's avatar, or called out by a right mouse button click after placing the mouse cursor over the user's avatar or by selecting the contact field using a finger (in the case of touch screens).

It is appreciated that the webcasting webpage of a recorded webcast that is selected from the second window (202 in FIG. 2) on the main web page (200 in FIG. 2) may have one or more control interfaces (not shown in the Figures), for instance, buttons or sliding bars, to allow users to start viewing, stop viewing, pause viewing and select viewing from a particular part of the recorded webcast. It is also appreciated that these control interfaces may allow a user to scroll to a previous part of a live webcast.

The webcasting webpage 400 further includes a scrollable list (not shown in the Figures) containing the web pages of all the recorded webcast and current live webcast, i.e. the works, authored by a specific webcaster. The entries in the list are selectable and upon selecting an entry, the webcasting webpage 400 associated with the selected entry would appear in a separate Internet browser window or a separate Internet browser tab.

The web portal also includes one or more control interfaces (not shown in the Figures) accessible only to the webcaster (Level 1 or 2 user). The one or more control interfaces enables the webcaster (Level 1 or 2 user) to block or release specific users' access to the webcasting webpage 400 or delete offensive or outdated textual data in the chat window 408. In addition, there are one or more control interfaces (not shown in the Figures) accessible only to a system administrator (Level 1 user) and not accessible to the Level 2 users. These control interfaces allows system administrators to edit or delete offensive, irrelevant or outdated video, audio, picture or textual data that is streamed or uploaded to the web portal. Advantageously, this allows the system administrator (Level 1 user) to act as a moderator to censor or filter out offensive text/video/audio data, or drop/block user connection to the webcasting webpage 400 of an abusive user. It is noted that a Level 2 user does not have rights to censor/moderate content uploaded/created by all users in the web portal like the system administrator. However, he/she has the right to perform censorship and act as moderator for all of his/her created webcasts and user blog.

The operation of the example embodiment is described as follow.

With reference to FIGS. 1 to 4, assuming a webcast of the first location captured by the first camera 110 and the second camera 118 is to be broadcasted and made available on the web portal of the example embodiment for viewing by the public domain, i.e. users (all Level 1 to 5 users) in the Internet. To broadcast the webcast, firstly, a user or webcaster (Level 2 user) of a WiFi enabled communication unit, e.g. the first communication unit 114, in the vicinity of the WLAN 102 gains access to the Internet 112 via WiFi through the use of the control unit 104.

After gaining access to the Internet 112, the webcaster accesses the main web page 200 of the web portal to create a webcast from his/her user webpage 300 or from a third party software on the first communication unit 114 for broadcasting on the Internet 112. During webcast creation, the webcast would only be available for viewing by the user of the first communication unit 114. The webcast is created after, firstly, the necessary camera connection is established; secondly, the camera view is selected; thirdly, the selection to stream one or both videos captured by the first and second camera respectively (110 and 118 in FIG. 1) is made; and, lastly, the webcaster selects 'start' using the start/stop control button 320. Selecting 'start' also indicates the webcaster's status as available for communication. Assuming the webcaster selected the streaming of videos captured by both cameras, when the webcast is started, the captured videos of the cameras 110 and 118 are streamed from the cameras 110 and 118 to the control unit 104. The control unit 104 in turn streams the captured videos to the server 108 hosting the web portal. The server 108 then streams the captured videos to any user communication unit (e.g. one of the N communication units 116) accessing the webcasting page 400. If the webcaster selects the webcast to be available to a closed group, all the users viewing the webcast are only whom the webcaster has invited. In this case, the webcast is not publicly available. Conversely, if open group is selected, public users may access the webcast.

On starting the webcast, the webcaster's avatar would also appear on the contact list (306 in FIG. 3 and 402 in FIG. 4) in the user webpage 300 and the webcasting webpage 400 to indicate his/her webcast's availability. Furthermore, the webcast, which is just activated, would be posted in the first window 202 of the main web page 200 and made available for users accessing the Internet 112 to view via their communication units, i.e. the N communication units 116. By selecting the posting of the webcast from the first window 202, users in the Internet 112 can access the webcasting webpage 400.

Recorded footages of past webcasts can also be viewed by other users by selecting and accessing the webcasting webpage of a previous webcast entry from the second window 204 in the main page 200.

Any Level 2 users, and Level 3, 4 or 5 users accessing the webcasting webpage 400 that are given communication privileges by the webcaster to communicate with him/her, can initiate real-time communication with the webcaster during a live webcast or, if it is a recorded webcast, when the webcaster has accessed the user webpage 300. Communication with the webcaster can be done by selecting the first field 412 (on the webcasting webpage 400), which contains the avatar of the webcaster. The real-time communication can be made using text messaging via the chat window 408, via audio transmission over Internet or video conferencing. Advantageously, viewers of a live or recorded webcast can provide comments about the live or recorded webcast by writing in the chat window 408, by speaking to the webcaster, which can be heard by other viewers, or by gesturing in a video conference display window 410.

In the case where only one view is streamed, advantageously, the webcaster can use the camera control capabilities of the system 100 to zoom and pan the webcast camera or cameras. This is useful for the illustration of a particular feature, which can only be clearly viewed by zooming and/or panning the camera view to focus on that particular feature. A webcaster may also use the camera control capabilities of the system 100 to produce video clips of, for instance, short documentaries or advertising videos.

In the case where both the captured videos on the first and second cameras (110 and 118 in FIG. 1) are streamed, the webcast viewers can advantageously switch between camera views captured on the first and second cameras (110 and 118 in FIG. 1) in the webcast display window 404.

Figure 6:
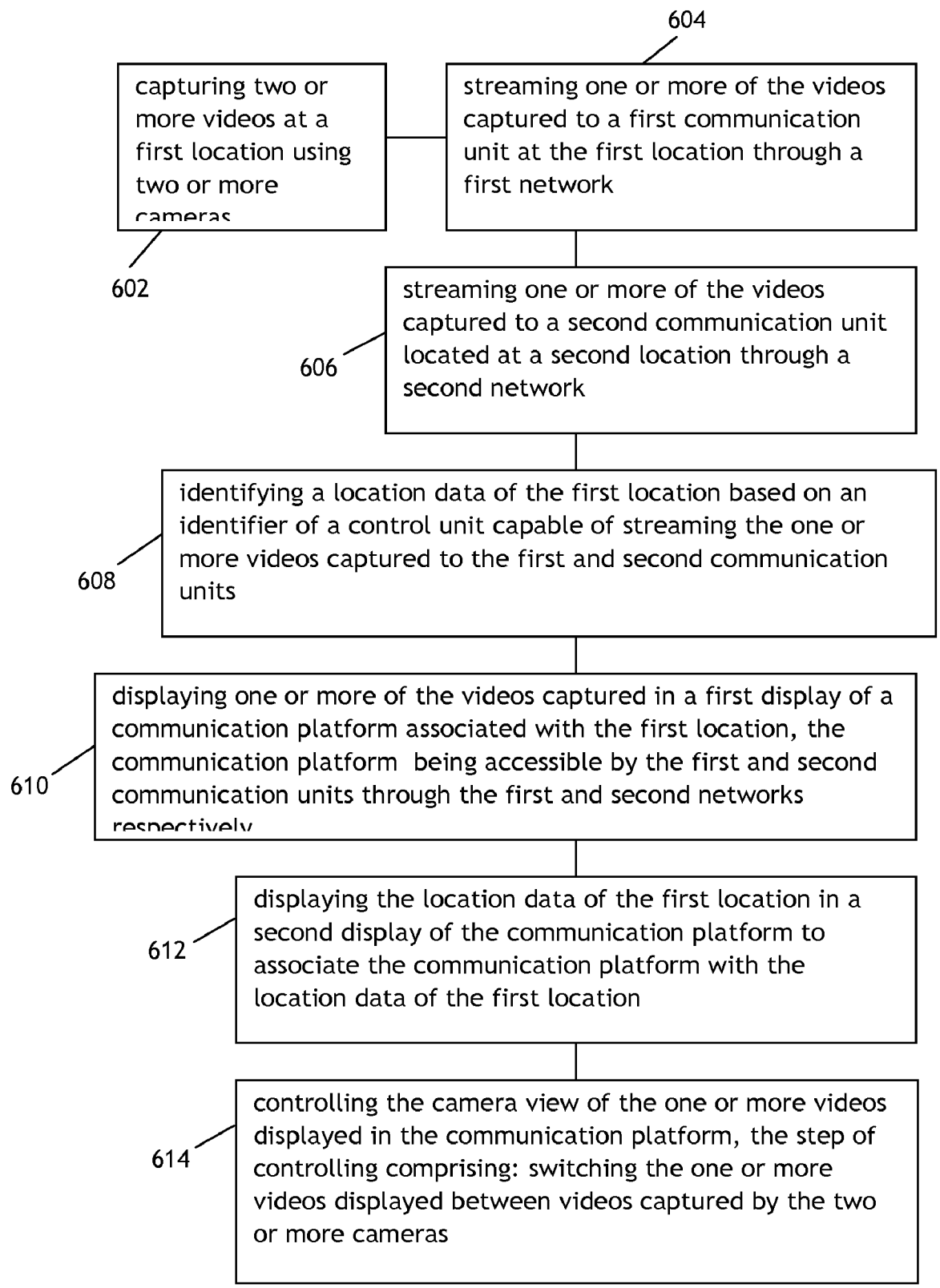
FIG. 6 is a flowchart illustrating a method according to an example embodiment of the present invention.

With reference to FIG. 6, the example embodiment essentially provides a method for facilitating user communication from a location. The method includes the following steps, the steps not necessarily being in an order as laid out in FIG. 6.

At step 602, capturing two or more videos at a first location (e.g. the location of the WLAN 102 in FIG. 1) using two or more cameras (e.g. cameras 110 and 118 in FIG. 1).

At step 604, streaming one or more of the videos captured to a first communication unit (e.g. the first communication unit 114) at the first location through a first network (e.g. WLAN 102 in FIG. 1).

At step 606, streaming one or more of the videos captured to a second communication unit (e.g. one of the N communication units 116 in FIG. 1) located at a second location through a second network (e.g. the Internet 112).

At step 608, identifying a location data of the first location based on an identifier (e.g. IP Address) of a control unit (e.g. 104 in FIG. 1) capable of streaming the one or more videos captured to the first and second communication units (e.g. 114, 116 in FIG. 1).

At step 610, displaying one or more of the videos captured in a first display (e.g. 304 in FIG. 3 and 404 in FIG. 4) of a communication platform (e.g. the webpage 300 in FIG. 3 or 400 in FIG. 4) associated with the first location, the communication platform (e.g. the webpage 300 in FIG. 3 or 400 in FIG. 4) being accessible by the first and second communication units (e.g. 114 in FIG. 1 and one of the N communication units 116 in FIG. 1 respectively) through the first and second networks respectively (e.g. WLAN 102 in FIG. 1 and the Internet 112 respectively).

At step 612, displaying the location data of the first location in a second display (e.g. 340, 342 in FIG. 3, and 416, 420 in FIG. 4) of the communication platform (e.g. the webpage 300 in FIG. 3 or 400 in FIG. 4) to associate the communication platform (e.g. the webpage 300 in FIG. 3 or 400 in FIG. 4) with the location data of the first location.

At step 614, controlling the camera view of the one or more videos displayed in the communication platform (e.g. the webpage 300 in FIG. 3 or 400 in FIG. 4), the step of controlling comprising: switching the one or more videos displayed between videos captured by the two or more cameras (e.g. cameras 110 and 118 in FIG. 1).

Referring back to FIGS. 3 and 4, the user webpage 300 may further include one or more editing tools (not shown in the Figures) for registered users to set up and maintain a personal webpage, i.e. a user blog. Examples of such editing tools include text editing interfaces, picture/video/audio file uploading interfaces, blog preview and publishing interfaces, and the like. In this case, blog entries i.e. text, pictures, video file or audio file postings would be added and edited at the user webpage 300. Other users can access these blog entries from the webcasting webpage 400. Also, each recorded webcast may be made available in chronological order for viewing by users accessing the webcasting webpage 400.

It is appreciated that, besides a digital camera, the first and second cameras 110 and 118 described with reference to FIG. 1 may be professional video cameras, such as those used in television shows and film production, which may be studio-based or mobile. The first and second cameras 110 and 118 may also be camcorders, which combine a camera and a Video Cassette Recorder or other recording device in one unit. Furthermore, the camera 110 may be a closed-circuit television camera, generally used for security, surveillance, and/or monitoring purposes. The first and second cameras 110 and 118 may also contain multiple lenses that can be independently controlled in terms of zoom and pan. It is appreciated that several other cameras may be located at the webcast location.

It is appreciated that instead of the Internet 112 described with reference to FIG. 1, it may be a Local Area Network, a Mobile Telecommunication network or an Intranet.

It is appreciated that if a communication unit 114, 116 described with reference to FIG. 1 is a desktop or laptop computer, the buttons, fields and selectable displays i.e. control interfaces, for instance, the buttons, in the web pages described earlier with reference to FIGS. 2 to 4, would be activated by a mouse cursor. If the communication unit is a portable device with a touch screen, the mouse interaction would be replaced by finger contacts and movements. If the communication unit is a portable device having only keypads or keyboards, the mouse interaction would be replaced by activation keys and direction keys on the keypads or keyboards.

It is appreciated that the first communication unit 114 described with reference to FIG. 1 may be connected to the control unit 104 via wireless or wired technologies other than WiFi. For instance, Bluetooth, Global System for Mobile Communication (GSM), 2G, 2.5G, 3G, 3.5G, 4G or further Generation of Telecommunication Networks, wired Ethernet connection, via USB connection, Firewire connection and the like.

It is appreciated that the first communication unit 114, the camera 110 and the control unit 104 described with reference to FIG. 1 may be components of a single device. For instance, the single device may be a laptop computer, mobile phone, personal digital assistant, media player, entertainment device or communication device. In this case, the control signals sent to the camera can be either from the user webpage (300 in FIG. 3) via Internet or from the user interfaces of the first communication unit 114.

It is appreciated that the camera 110 and the control unit 104 described with reference to FIG. 1 may be components of a single device. For instance, the single device may be a laptop computer, mobile phone, personal digital assistant, media player, entertainment device or communication device.

It is appreciated that the control unit 104 may be a component, e.g. a microprocessor or microcontroller, of the server 108 described with reference to FIG. 1.

It is appreciated that the web portal may instead be a third party software application installed on every communication unit 114, 116 described earlier with reference to FIG. 1, such that it is accessible only by users who install the application as opposed to it being a server based application accessible to registered users via the Internet. The third party software may contain all the features of the web portal described earlier with reference to FIGS. 2 to 4.

It is appreciated that more cameras may be installed at the first location described earlier with reference to FIG. 1 to capture several camera views. Correspondingly, the user webpage (300 in FIG. 3) (webcaster's view) and the webcasting webpage (400 in FIG. 4) (other users' view) may contain more than one displays for displaying the several camera views. Also, one display may be split up into two or more smaller displays to display two or more camera views, for instance, in a television picture-in-picture manner.

It is appreciated that the web portal described earlier may further include a webpage having a listing of the avatars of all the webcasters sorted by, for instance, popularity and most recently created webcast. Advantageously, users may select to view recorded or live webcasts by popular webcasters. The profile of the webcaster may be made available for public viewing (i.e. available to all Level 1 to 5 users) or for viewing by selected users (e.g. only available to Level 1 to 4 users). Other user's review and commentaries on the webcaster and his/her webcasts may also be made available to the public or selected users.

It is appreciated that the camera control capabilities or services of the system (100 in FIG. 1) can be made available to Level 3 to 5 users other than the webcaster (Level 1 or 2 user). To enable this, the web portal described earlier may include one or more control interfaces for upgrading to Level 2 user or subscribing to camera control services and to enable them to have the ability to control the camera, for instance, to alter the camera view. In this case, advantageously, Level 3 to 5 users can be provided with a remote webcast camera that is controllable to provide the desired view over the Internet. Users can select a particular camera view to provide commentaries and narration of the particular camera view via text messaging, audio over Internet or video conferencing to other users. Furthermore, the web portal may include one or more control interfaces for users to record the webcast containing all the users' manipulations with the camera view, and the textual, pictorial, audio and video commentaries, narration and illustration, and store the recorded webcast as a video file in the database (106 in FIG. 1) for later viewing by the public. Advantageously, users can use the remote webcast camera to shoot a documentary or a movie.

With reference to FIGS. 3 and 4, it is appreciated that the contact list (306 in FIG. 3) in the user webpage (300 in FIG. 3) and the contact list (402 in FIG. 4) in the webcasting webpage (400 in FIG. 4) may contain a list of all the user fields who the webcaster has selected as a friend. That is, these user fields are selected to be displayed in the contact list until it is removed by the webcaster. If the friend is online, i.e. accessing the webcasting webpage (400 in FIG. 4), the field of the friend in the list would indicate that the friend is online, e.g. the word 'available' would appear in the field. If the friend is not online, the field would indicate as such, e.g. the words 'not available' would appear. Selection to become a friend can, for instance, be done only at the contact list (306 in FIG. 3) in the user webpage (300 in FIG. 3) by selecting a 'set as friend' option in a pop-up menu, which appears automatically upon placing the mouse cursor over the user avatar in the field or called out by a right mouse button click after placing the mouse cursor over the user avatar in the field.

It is appreciated that, in the example embodiment described earlier with reference to FIGS. 3 to 4, a first user being initiated communication by a second user via one to one text messaging, audio transmission over the Internet and/or video conferencing would have to approve the communication initiation before communication can commence unless the first user is already selected as a friend of the second user initiating the communication. This advantageously protects the identity of the first user.

With reference to FIG. 3, one or more activators could be provided in the user webpage 300 for the user creating the webcast to select music or sound pieces to be played either as the sole source of sound replacing the ambient sound captured in the webcast video or as background music/sound complementing the captured ambient sound in the webcast video. Sound effects may also be added through the use of one or more activators at any juncture during the duration of a live webcast or during the playtime of a recorded webcast. There may also be a mute control for turning off the sound entirely. In addition, one or more control interfaces may be provided for re-recording a recorded webcast so as to incorporate or change the subtitles, sound effects, sound or music played in the recorded webcast.

With reference to the subtitle control interfaces described with reference to FIG. 3, one or more control interfaces could be provided to allow the webcaster to assign a user in the contact list 306 to provide subtitles for the webcast. The control interfaces for adding subtitles that are available to the assigned user could be similar to the subtitle control interfaces as herein described with reference to FIG. 3.

With reference to FIG. 1, it is appreciated that there may be more than one devices similar to the first communication unit 114 present at the webcast location that includes a camera like the second camera 118. Each one of these devices may be used for capturing a different camera angle of the webcast.

Figure 5:
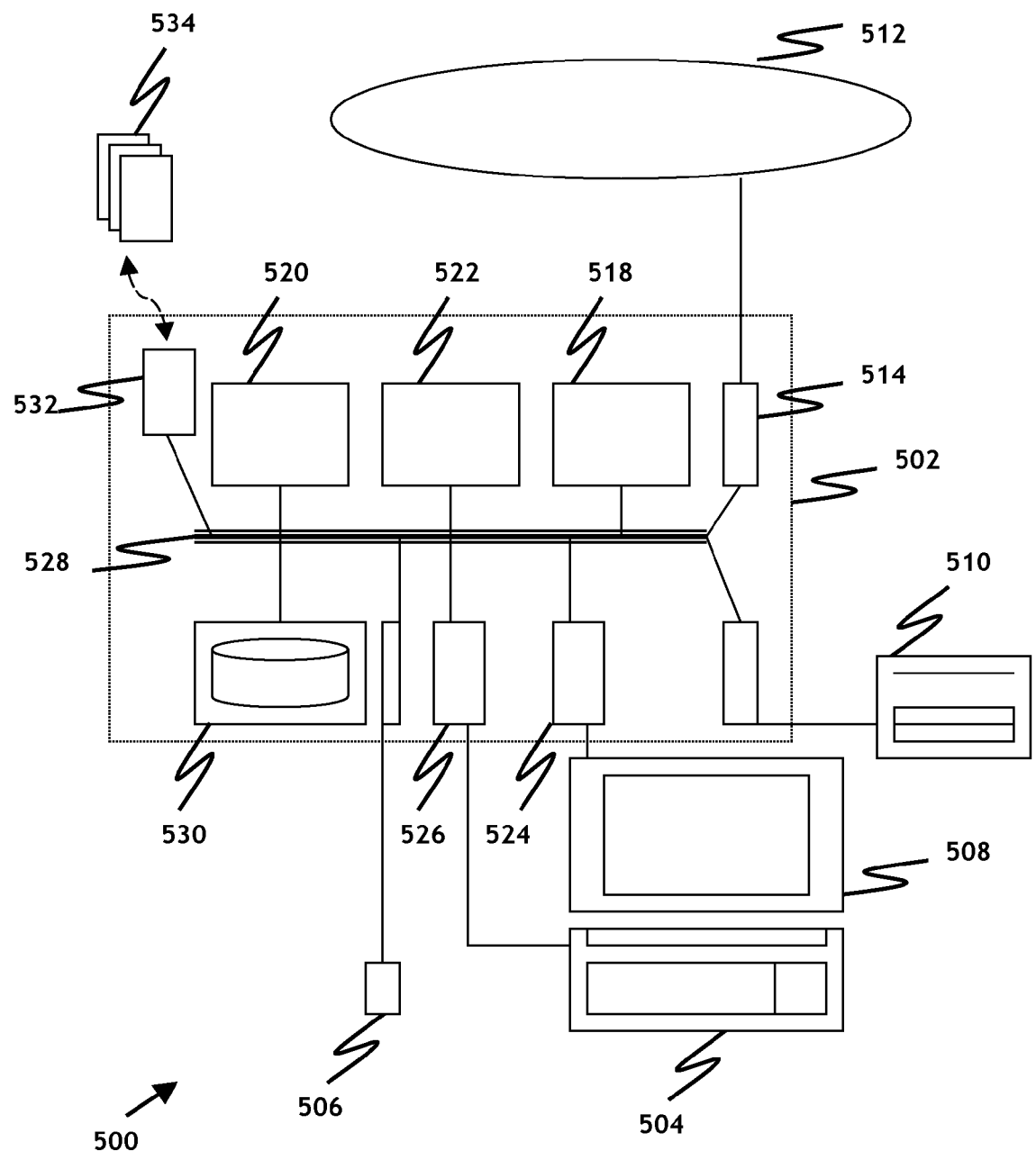
FIG. 5 is a schematic drawing of a computer system of an example embodiment of the present invention.

The control unit 104, server 108 and the communication units 114, 116 of the example embodiment described earlier with reference to FIG. 1 can be implemented on a computer system 500, schematically shown in FIG. 5. There may be provided software, such as one or more computer programs being executed within the computer system 500, and instructing the computer system 500 to conduct the methods of the example embodiment, including the instructions for the web applications for the web portal, device drivers for camera control, etc.

The computer system 500 comprises a computer module 502 and may include input modules such as a keyboard 504 and mouse 506 and a plurality of output devices such as a display 508, and printer 510.

The computer module 502 is connected to a computer network 512 via a suitable transceiver device 514, to enable access to e.g. the Internet (112 in FIG. 1) or other network systems such as a wired Local Area Network (LAN) or Wide Area Network (WAN). The computer module 502 may be connected to one or more external wireless communication enabled devices 534 via a suitable wireless transceiver device 532 e.g. a WiFi transceiver, Bluetooth module, Mobile telecommunication transceiver suitable for Global System for Mobile Communication (GSM), 3G, 3.5G, 4G telecommunication systems, and the like.

The computer module 502 in the example includes a processor 518, a Random Access Memory (RAM) 520 and a Read Only Memory (ROM) 522. The computer module 502 also includes a number of Input/Output (I/O) interfaces, for example I/O interface 524 to the display 508, and I/O interface 526 to the keyboard 504.

The components of the computer module 502 typically communicate via an interconnected bus 528 and in a manner known to the person skilled in the relevant art.

The computer programs may include one or more software applications for e.g. web accessibility/development/maintenance, operating the computer system 500 (i.e. operating system), network security, file accessibility/management/maintenance/editing, database management/maintenance/editing, which are applications typically equipped on a web server, or a desktop or portable computer. The computer programs may be supplied to the user of the computer system 500 encoded on a data storage medium such as a CD-ROM, on a flash memory carrier or a Hard Disk Drive, and are to be read using a corresponding data storage medium drive of a data storage device 530. Such application programs may also be downloaded from the computer network 512. The application programs are read and controlled in its execution by the processor 518. Intermediate storage of program data maybe accomplished using RAM 520.

Furthermore, one or more of the steps of the computer programs may be performed in parallel rather than sequentially. One or more of the computer programs may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the WLAN system. The computer program when loaded and executed on such a general-purpose computer effectively results in an apparatus that implements the steps of the methods of the example embodiment.

Many modifications and other embodiments can be made to the system and its method by those skilled in the art having the understanding of the above described disclosure together with the drawings. Therefore, it is to be understood that the device and its utility is not to be limited to the above description contained herein only, and that possible modifications are to be included in the claims of the disclosure.

The invention claimed is:

1. A system for facilitating user communication from a location, the system comprising:
   two or more cameras for capturing two or more videos at a first location;
   a control unit for streaming one or more of the videos captured to a first communication unit at the first location through a first network, and streaming one or more of the videos captured to a second communication unit located at a second location through a second network;
   a server for identifying a location data of the first location based on an identifier of the control unit; and
   a communication platform associated with the first location, the communication platform being accessible by the first and second communication units through the first and second networks respectively, the communication platform comprising:
   a first display for displaying one or more of the videos captured;
   a second display for displaying the location data of the first location identified by the server to associate the communication platform with the location data of the first location; and
   one or more control interfaces for controlling the camera view of the one or more videos displayed in the first display, wherein controlling the camera view comprises switching the one or more videos displayed in the first display between videos captured by the two or more cameras.

2. The system as claimed in claim 1, wherein the first network is a Wireless Local Area Network and the second network is the Internet.

3. The system as claimed in claim 1, wherein the communication platform comprises one or more control interfaces for adding subtitles to the video displayed in the first display.

4. The system as claimed in claim 3, wherein the communication platform comprises one or more timing mechanisms for delaying the streaming of the video displayed in the first display to compensate for delays due to entering of subtitles.

5. The system as claimed in claim 3, wherein the subtitles are added using a speech-to-text based application.

6. The system as claimed in claim 1, wherein the first communication unit, the control unit and one of the cameras are components of a single device.

7. The system as claimed in claim 1, wherein the control unit and one of the cameras are components of a single device.

8. The system as claimed in claim 1, wherein the control unit is a component of the server.

9. The system as claimed in claim 1, wherein the communication platform comprises one or more avatars for identifying the first or second communication unit accessing the communication platform.

10. The system as claimed in claim 1, wherein the communication platform comprises one or more control interfaces only accessible to the first communication unit for disconnecting the second communication unit when the second communication unit is used to access the communication platform for viewing of the first display.

11. The system as claimed in claim 1, wherein user interaction with the one or more communication interfaces and changes to the camera view in the first display is captured and stored as a video file in a database.

12. The system as claimed in claim 1, wherein the identifier is an Internet Protocol Address of the control unit.

13. The system as claimed in claim 1, wherein a separate sound source is provided over ambient sound captured in one of the videos at the first location.

14. The system as claimed in claim 1, wherein the one or more videos captured are recorded and stored as a video file in a database.

15. The system as claimed in claim 1, wherein controlling the camera view further comprises zooming in or out, or panning the camera view.

16. The system as claimed in claim 1, wherein the communication platform further comprises one or more communication interfaces for enabling users of the first or second communication unit to initiate communication with one another or with users of other communication units accessing the communication platform.

17. The system as claimed in claim 16, wherein the one or more communication interfaces enable user communication via instant messaging, telephone conferencing or video conferencing.

18. A method for facilitating user communication from a location, the method comprising:
   capturing two or more videos at a first location using two or more cameras;
   streaming one or more of the videos captured to a first communication unit at the first location through a first network;
   streaming one or more of the videos captured to a second communication unit located at a second location through a second network;
   identifying a location data of the first location based on an identifier of a control unit capable of streaming the one or more videos captured to the first and second communication units;
   displaying one or more of the videos captured in a first display of a communication platform associated with the first location, the communication platform being accessible by the first and second communication units through the first and second networks respectively;
   displaying the location data of the first location in a second display of the communication platform to associate the communication platform with the location data of the first location; and
   controlling the camera view of the one or more videos displayed in the communication platform, the step of controlling comprising:
      switching the one or more videos displayed between videos captured by the two or more cameras.

19. The method as claimed in claim 18, wherein the method further comprises:
   adding subtitles to the first display using one or more control interfaces in the communication platform.

20. The method as claimed in claim 19, wherein the method further comprises:
   delaying the streaming of the video displayed in the first display to compensate for delays due to entering of subtitles using one or more timing mechanisms.

21. The method as claimed in claim 19, wherein the method further comprises:
   adding the subtitles using a speech-to-text based application.

22. The method as claimed in claim 18, wherein the method further comprises:
   identifying a user accessing the communication platform via the first or second communication unit using one or more avatars.

23. The method as claimed in claim 18, wherein the method further comprises:
   capturing and storing user interaction with the one or more communication interfaces and changes to the camera view of the one or more videos displayed in the communication platform as a video file in a database.

24. The method as claimed in claim 18, wherein the method further comprises:
   providing a separate sound source over ambient sound in one of the videos at the first location.

25. The method as claimed in claim 18, wherein the method further comprises:
   recording one of the videos captured and storing the recorded video as a video file in a database.

26. The method as claimed in claim 25, wherein the method further comprises:
   re-recording the recorded video so as to incorporate or change subtitles, sound effects, sound or music already incorporated in the recorded video using one or more control interfaces in the communication platform.

27. The method as claimed in claim 18, wherein controlling the camera view further comprises zooming in or out, or panning the camera view.

28. The method as claimed in claim 18, wherein the method further comprises:
   enabling users of the first or second communication unit to initiate communication with one another or with users of other communication units accessing the communication platform using one or more communication interfaces.

29. The method as claimed in claim 28, wherein the method further comprises:
   enabling the user communication via instant messaging, telephone conferencing or video conferencing.

30. The method as claimed in claim 18, wherein the method further comprises:
   disconnecting a communication unit accessing the communication platform using one or more control interfaces in the communication platform.

* * * * *